INVENTOR.
CARL B. KAISER
BY
Stanley B Cole
ATTORNEY

Dec. 8, 1964   C. B. KAISER   3,160,524
APPARATUS FOR CHARGING POWDER PARTICLES AND APPLYING
THE CHARGED PARTICLES TO A RECEIVING MEMBER
Filed Feb. 13, 1962   6 Sheets-Sheet 6

Fig. 8

INVENTOR.
CARL B. KAISER
BY
Stanley B Cole
ATTORNEY

3,160,524
APPARATUS FOR CHARGING POWDER PARTICLES AND APPLYING THE CHARGED PARTICLES TO A RECEIVING MEMBER

Carl B. Kaiser, Rochester, N.Y., assignor to Xerox Corporation, Rochester, N.Y., a corporation of New York
Filed Feb. 13, 1962, Ser. No. 173,015
15 Claims. (Cl. 118—637)

This invention relates to apparatus for the application of surface coatings of charged powder. More specifically, the invention relates to charging of electroscopic powder particles in a pressurized aerosol and effecting a predetermined distribution thereof, as for the uniform application of the powder onto a receiving surface, such as a sheet, plate or the like.

Electroscopic powders are used in the field of xerography, for example, as disclosed in Carlson Patent 2,297,691, issued October 6, 1942, in which a xerographic plate comprising a layer of photoconductive insulating material on a conductive backing is first given a uniform electric charge over its surface and is then exposed to an activating radiation image of the subject matter to be reproduced, usually by conventional projection techniques. This exposure discharges the plate areas in accordance with the radiation intensity that reaches them, and thereby creates an electrostatic latent image on or in the photoconductive layer. Development of the latent image is effected with an electrostatically charged, finely divided material such as an electroscopic powder that is brought into surface contact with the photoconductive layer and is held thereon electrostatically in a pattern corresponding to the electrostatic latent image.

In conventional line copy applications of xerography, the developed image is usually transferred to a support surface on which it may be affixed by any suitable means. In this instance, development is usually effected by means of a two-component developer of a type disclosed in Walkup Patent 2,618,551. One component of the developer is a resinous material termed "toner" which is supported on more coarsely divided material component termed "carrier." The two components constitute the developer that is cascaded toward and over the electrostatic image during which the toner becomes triboelectrically charged and is attracted from the carrier to the image to effect development.

In still another development process of xerography, electrostatic images are developed by means of a sheet, plate, or the like, termed a "donor" that contains a uniform layer of toner which has been previously applied to a surface thereof. One form of such apparatus is disclosed in Mayo Patent 2,895,847. When presented in surface contact with a xerographic plate having an electrostatic image, toner is selectively removed from the donor surface and is attracted to the electrostatic image to effect development. When there is no relative movement between the surfaces, the development method is unique in that with proper loading, one can develop an electrostatic image while simultaneously producing the reverse image on the donor surface from which the toner was removed. Thereafter the xerographic plate may be further processed in the conventional manner described above, while the donor itself may be separately utilized. For example, where the donor is of transparent material on which a uniform toner layer had been applied to a proper level, selective transfer to the xerographic plate leaves the donor with an image transparency which can then be used for projection purposes. Such a use is disclosed in copending application Serial No. 140,842, filed September 26, 1961, in the name of Hitchcock et al., in which an image transparency is formed on a glass plate donor supporting a uniform layer of toner on one surface thereof. An opaque donor could similarly be used for projection purposes utilizing the principles of reflection rather than transmission.

The toner layers on the donor largely determine the quality and fidelity of images thus formed both on the xerographic plate and donor itself. The donor image areas must be clear and sharp and devoid of toner particles, while the non-image areas must present a uniform block against transmission or reflection of light. It should be apparent that poor fidelity and imperfections become increasingly pronounced as images are projected at increased magnification ratios. It follows therefore, that the application of such toner layers is critical in that they must be uniformly applied while being selectively releasable under the influence of a selective electrostatic field.

In accordance with one highly suitable use for the instant invention, such layers are applied by electrostatic charging of powder particles contained in a pressurized aerosol and directionally disseminating the charged particles to deposit onto the surface of a donor or other recipient surface. During the deposition, the donor is maintained preferably at ground or opposite polarity to which the toner is being charged. However employed, whether it be the application of toner onto donor surfaces or for the direct development of xerographic images, the apparatus of the invention accords utility and novelty to the presentation of developer particles.

It is therefore an object of the invention to provide novel method and apparatus for electrostatic charging of powder particles in an aerosol.

It is a further object of the invention to provide novel method and apparatus for electrostatic charging of resinous powder particles in an aerosol.

It is a further object of the invention to provide novel method and apparatus for applying charged toner onto the surface of a receiving member.

It is a further object of the invention to provide novel method and apparatus for disseminating electrostatically charged toner to a receiving member capable in presentation of developing electrostatic images while retaining on its surface a reverse image to that developed of high fidelity.

It is a further object of the invention to apply developer to donor sheets on which projectable images can be formed by the techniques of xerography.

These and other objects of the invention are attained in an embodiment that includes an elongated shell housing having an aperture at one end at which to mask or support a surface of a sheet, plate, or the like for receiving a uniform toner layer, and a toning head supported at the opposite end of said housing and extending toward said aperture, said toning head including inlet means to receive a continuous flow of pressurized aerosol of powder to be applied, directional outlet means to discharge the aerosol, a composite disk supported with a surface angularly inclined in the path of aerosol discharge, said disk being of a composition that will charge the powder of the high velocity aerosol impinging thereagainst and deflecting the powder toward the aperture to deposit against a surface of a plate being supported and electrically maintained thereat.

For resinous powders, the disk surface is continually scraped by means of a knife to present a renewed surface to the impinging aerosol. In the absence of scraping, the disk surface becomes glazed reducing the consistency of charging effect.

Charging the powder in a manner of the invention has been found most effective, and superior to prior methods of the known art. The prior art, for example, includes positioning a corona source in the stream of marking particles. While this has been tried, it has not achieved the uniformity of charge effected by means of the apparatus of the invention. The two component cascade system mentioned above requires separation of toner from the carrier to be entrained in an air stream while at the same time, it is unable to achieve the quality and uniformity of the instant invention. Still another apparatus is disclosed in Hayford Patent 2,859,129 which uses a capillary lined with poorly conducting or semi-conducting minerals. This apparatus is primarily for use with non-resinous toners which do not destroy utility of the lining as by glazing caused by resinous toners.

An embodiment of the invention is illustrated in the following drawings in which.

Figure 1:
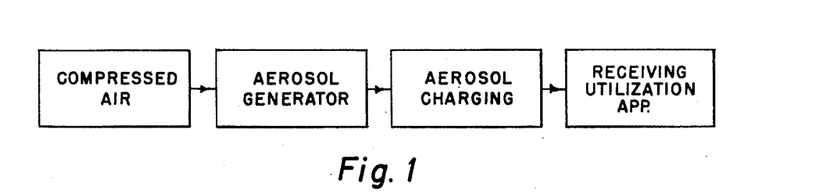
FIG. 1 is a block diagram showing the position of the charging step in applying electroscopic powders from an aerosol.
Figure 2:
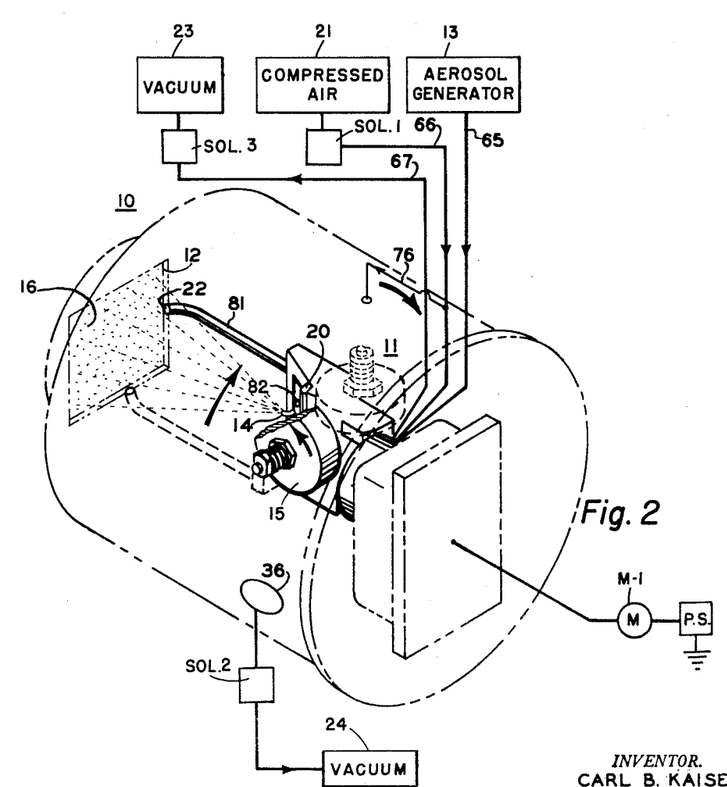
FIG. 2 is a schematic isometric of the apparatus of the invention.

For a general understanding of the invention, reference is made to FIGS. 1 and 2 of the drawings. As shown in FIG. 1, the general process in which the process and apparatus of the invention is a step or a part of is shown in block diagram. As is illustrated, an aerosol of the powder is generated by entraining powder particles in a compressed air stream by means of an aerosol generator as disclosed, for example, in my copending application Serial No. 110,805, filed May 17, 1961, and now Patent No. 3,129,850. From the aerosol generator the aerosol is admitted to the apparatus of the invention in which the entrained powder particles are caused to be charged to a desired polarity. The aerosol may thereafter be used in development utilization apparatus as for powder cloud development as described, for example, in the Hayford patent cited above, or may be directionally guided for application onto the surface of a donor sheet in the manner of the invention.

Referring more particularly to FIG. 2, there is schematically illustrated the apparatus of the invention comprised of a substantially air-tight housing 10 of cylindrical shape, (shown outlined) in which at one end is coaxially mounted a toning head 11, and at the opposite end in which is an aperture 12 axially aligned and adapted to mast a sheet, plate, or the like on which a uniform toner layer is to be applied. At least the interior of the housing is preferably electrically insulating as will be understood to prevent toner adherence and build up thereon.

As may be seen schematically therein, a pressurized aerosol generator 13 which may be of a type disclosed in my above-identified copending application is energized in proper order of sequence to supply an aerosol containing toner particles.

Composition of the toner particles may be of a commercially marketed type consisting of pigmented resin particles of largely polystyrene. The exact toner composition employed in the particular process may be of varying chemical composition depending on the ultimate utilization of the supporting element on which the toner is to be applied. Thus, the composition may consist largely of polystyrene resin in combination with coloring material. It may also contain magnetic particles in combination with a rosin modified phenol formaldehyde polymer and a percentage of polyvinyl butyral. Various electroscopic powders of the type contemplated are commercially marketed for utilization in various processes such as those marketed by Xerox Corporation of Rochester, New York, for the electrostatic process of xerography.

The aerosol is conducted into, through, and about the toning head to emerge from a nozzle 14 at high velocity and impinge at a predetermined angle of incidence onto the underfaced surface of a solid material, which in the described embodiment is a disc 15 adapted for rotation. The disc may be of a material selected in the triboelectric series to impart a charge of desired polarity to the powder coming in contact therewith. A preferred disc material to impart a positive charge to a resinous toner was found to be a natural unfired aluminum silicate mineral sold as "Wonderstone" by the Superior Steatite & Ceramic Corporation of Englewood, New Jersey. Other material also found to have varying degrees of suitability for like polarity charging included numerous other silicate materials and the like, such as unfired, natural hydrated magnesium silicate (soapstone), gray sandstone, red sandstone (quartzose sandstone of ferruginous type), flagstone (quartzose sandstone of argillaceous type), pyrophyllite, serpentine, oligoclase, spodumene, halloysite, montmorillonite and bentonite. In addition other materials have been found to charge toner negative including resins and other materials alone or on support members, such as epoxy resins, alone on a metallic support, nitrocellulose, isocyanate materials on aluminum support members, and polyurethane on aluminum.

The aerosol impinging onto the disc at high velocity causes a triboelectric charge to be imparted to the toner particles. As the charged particles ricochet off the disc, they are deflected toward the aperture or a portion thereof, depending on the size of aperture as will be understood, to deposit onto the surface of a member supported thereat. For purposes of discussion, the member supported at the aperture will be considered to be a donor plate, of transparent glass on which a conductive coating of tin oxide or the like has been previously coated. Glass sheets of this type are marketed commercially by the Pittsburgh Plate Glass Company under the trade name of NESA.

Motor M-1 is operative when energized to effect simultaneous rotational motion in two different planes, one rotating the toning head and the other rotating the ceramic disc axially perpendicular about the head axis. That is, the toning head rotates coaxially in the housing while the ceramic disc revolves separately thereabout being rotated simultaneously about its own axis which is perpendicular to the axis of the toning head. The angle of toner impact from the nozzle onto the disc is preset such that as the toning head revolves, the particles are caused to spray uniformly from the disc onto a member 16 supported at the aperture to receive a coating of toner particles. By this combination of rotations and directional discharge, there is enabled spraying a member having a surface area greater than the cross sectional area of the spray at the surface plane of the member. By rotation of the head, the spray circumferentially advances to effect uniform application over the entire surface area. With the member maintained at ground or opposite polarity to that of the charged toner, an electrostatic attraction of high order results such that the toner readily deposits and adheres onto the intended surface.

The disc rotates about its axis at a rate approximately $\frac{1}{10}$ that of the toning head and in so doing, is continually scraped by a stationary knife 20 to present a renewed or previously unimpinged surface to the impinging aerosol. By this means, it is possible to overcome a clogging or glazing effect caused by continuous impinging of resinous toners and which otherwise would result in reduced charging effectiveness of the disc. Approximately .0002" to .0004" of the disc is removed by the knife per disc rotation. During disc rotation, a nozzle connected to a deep vacuum source 23, connected through solenoid SOL-3 to behind the cutting blade in the direction of rotation, removes ceramic particles resulting from knife cutting action. This prevents ceramic particles from being entrained in the air stream of the aerosol.

To remove stray toner after completion of the application, the head rotates and solenoid SOL-1 is energized to emit high pressure air from a compressed air source 21 through a hose 66 to a discharge air nozzle 22 and through hose 76 to nozzle 77 to respectively direct the air to the areas surrounding the aperture and to the toning head to dislodge toner particles thereabout. This operation is important to prevent large agglomerates from subsequently causing non-uniformity of toner application. The dislodged particles are removed from the housing through an opening or openings in the housing connected through a solenoid SOL-2 to a high volume vacuum source 24. Dislodging and removal is effected between successive applications as when a subsequent member is presented into place at aperture 12 to receive a coating of toner particles.

Figure 3:
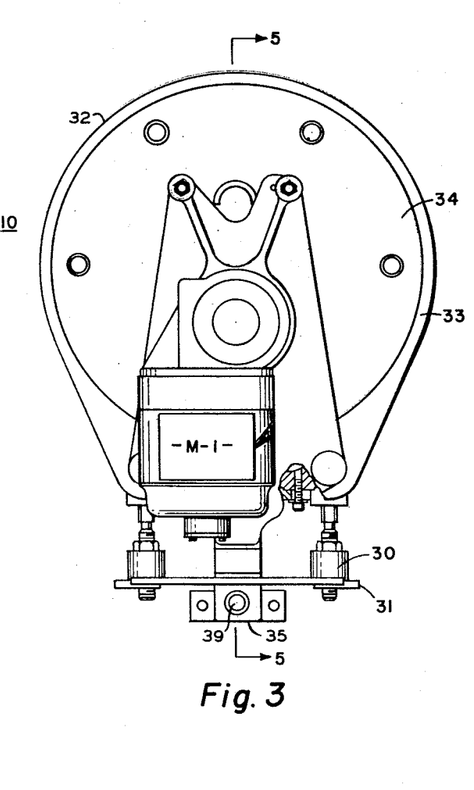
FIG. 3 is a rear elevation of the apparatus.
Figure 4:
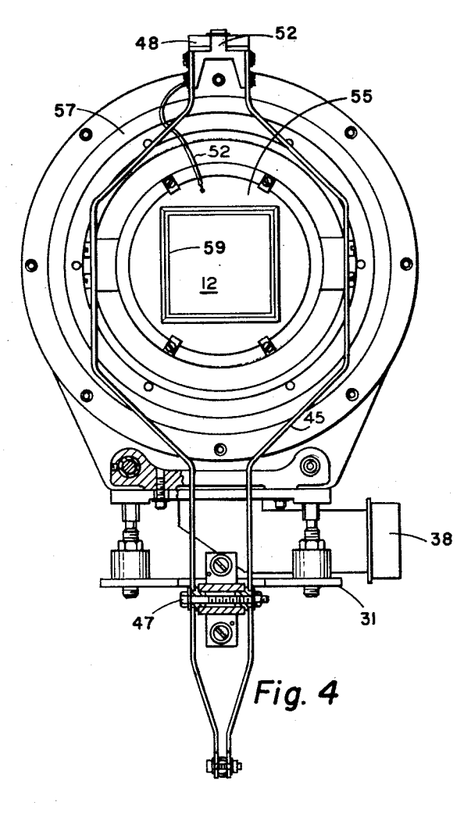
FIG. 4 is a front elevation of the apparatus.
Figure 5:
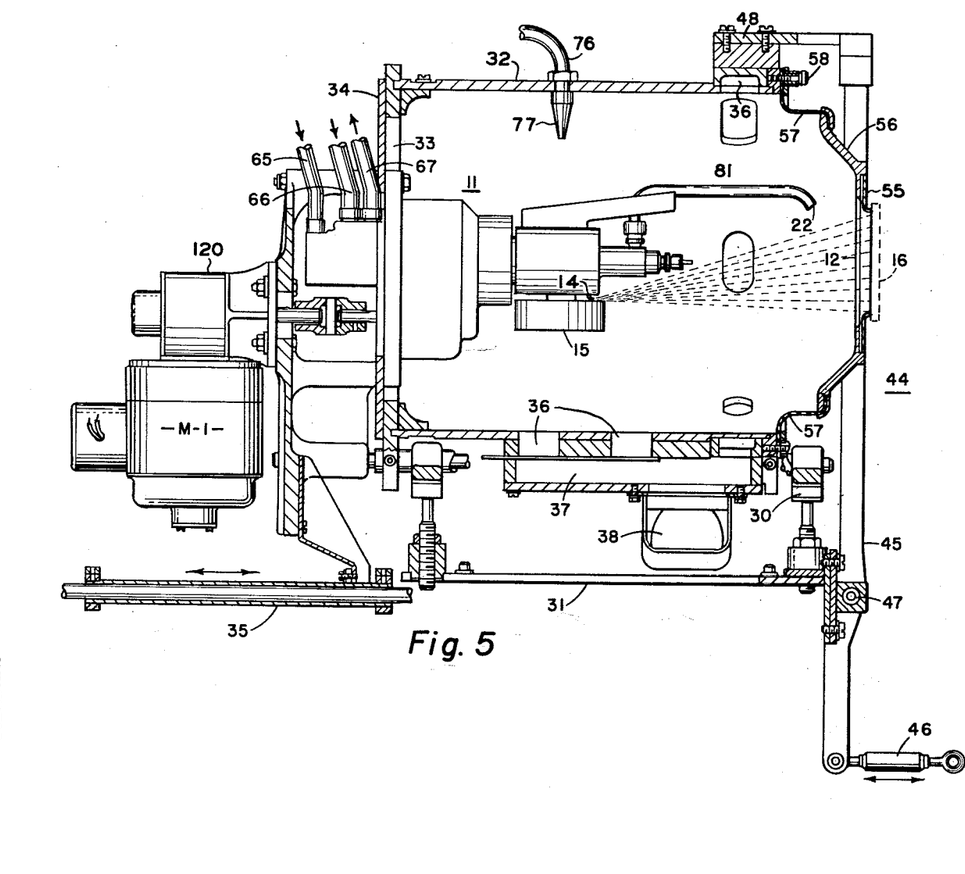
FIG. 5 is a sectional view taken substantially along lines 5—5 of FIG. 3.
Figure 6:
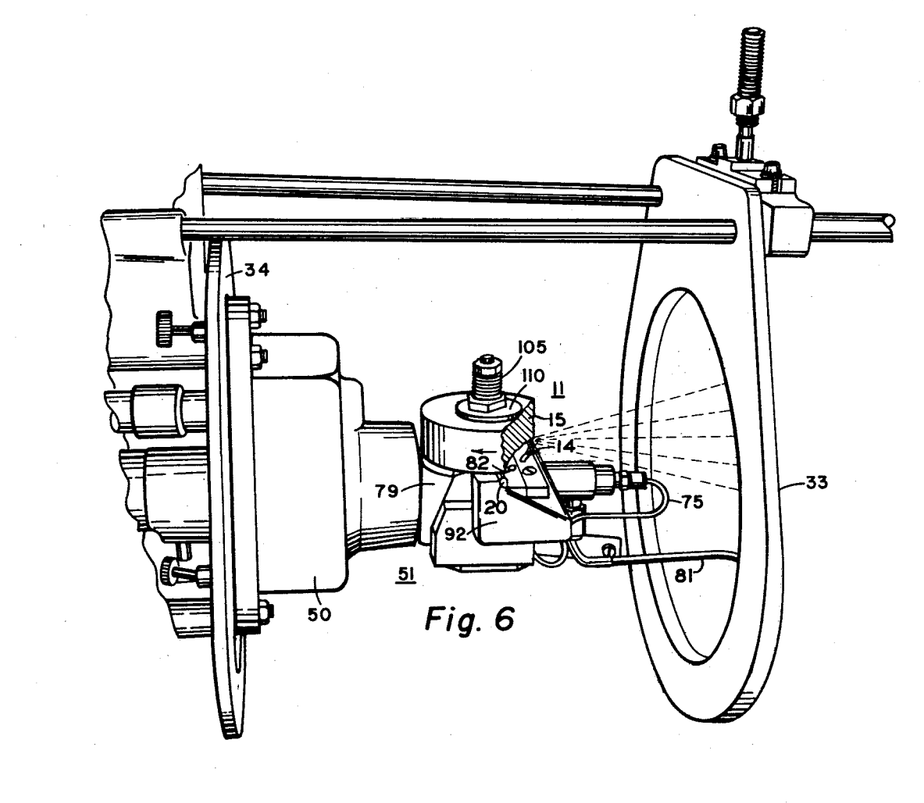
FIG. 6 is a perspective view of the toning head of the apparatus removed from the housing for clarity of illustration.
Figure 7:
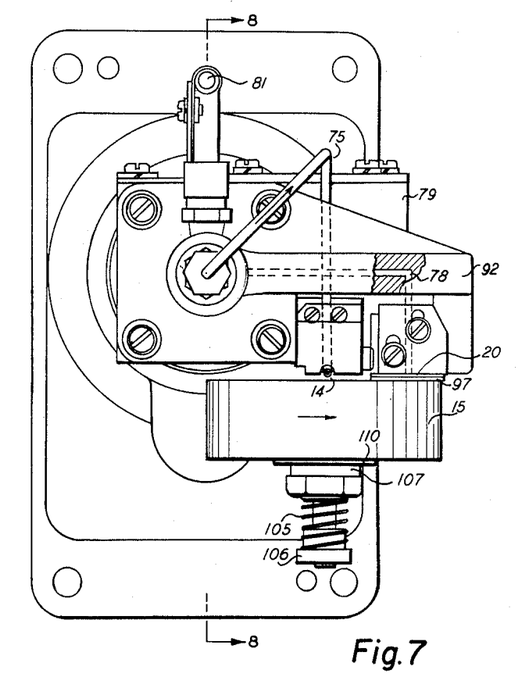
FIG. 7 is a front elevation of the toning head.

Referring now more particularly to FIGS. 3, 4 and 5, the apparatus is shown in greater detail. As may be seen, the housing 10, which preferably is electrically insulating, is supported at opposite corners on adjustable posts 30 which connect to a rigid support plate 31. The housing is comprised of a shell 32 at the rear end of which is a flange 33 having an aperture through which to insert the toning head. The toning head, to be described below, is mounted on a movable end plate 34 which bolts to flange 33. The head is supported externally of the housing on a draw slide support 35 slideably supported on a rod 39 such that by withdrawing the head, it can be removed for general servicing of the disc or other components.

About the internal periphery of the shell are a plurality of outlets 36 which connect to a common vacuum manifold 37 for removal of dislodged toner particles as aforesaid. Extending from the manifold is a duct connection 38 adapted to receive a flexible hose or the like to connect the manifold through solenoid SOL-2 to a vacuum source 24.

In the embodiment illustrated, aperture 12 is contained in a pivotal end wall or flexible mask 44 advanced and retracted by appropriate linkage adapted for use with an automatic plate positioner as, for example, disclosed in copending application Serial No. 172,996, filed concurrently herewith in the name of Lutzweit et al., and now Patent No. 3,129,113. Movement of the wall is effected by a yoke 45 having a coupling connection 46 to connect to a cam or the like for its operation. As the lower end of the yoke is moved laterally in one direction, the yoke pivots about pin 47 and the upper part of the yoke moves in an opposite direction. By this means a donor plate on a positioner such as a rotatable turret can automatically be removed from or placed into the toning position, as will be understood, without interfering with the rotative movement of the turret. That is, with plate positioning to be effected, the mask is withdrawn from the path of positioner movement. With a plate in position, the yoke is pivoted until the frame 55 about the aperture seats air-tight against or around a donor plate 16. The yoke is guided at its upper end by a follower 52 that moves in a guideway of bracket 48.

Aperture 12 is formed in a metal frame 55 mounted in a preformed concave phenolic plate 56. A rubber boot 57 connects plate 56 to the shell and is secured by means of mounting screws 58. Secured to the frame and extending therefrom toward a donor plate to be toned as to define the aperture is resilient gasket 59 which when urged by the yoke against a donor plate forms a substantially air-tight aperture seal therebetween. A lead 53 maintains the mask at ground potential.

The toner spray is generated by toning head 11 of the apparatus as will now be described with reference to FIGS. 6 through 9. As may be seen, the toning head 11 includes a tail section 49 to which the services are supplied and connected, a gear housing 50, and a forward rotatable head portion 51. Each of the services are transmitted at various pressures and includes the powder aerosol at approximately 10 to 20 p.s.i.g., compressed air at approximately 60 to 80 p.s.i.g. and vacuum at 20 mm. of mercury. They are connected via tubes 65, 66 and 67, respectively, to ports 68, 69 and 70 in the tail section. Therefrom, each of the services are further transmitted to their area of operation by means of a three segment, coaxially related tubular arrangement 71 adapted to rotate as will be described, and in which the center segment 72 transmits the aerosol, the middle segment 73 transmits compressed air, and the outer segment 74 transmits vacuum.

Connected to the discharge end of segment 72 is a smaller connecting tube 75 of approximately .080 inch in diameter in which a high velocity of about 400 to 500 feet per second is imparted to approximately one cubic foot of aerosol per minute. Tube 75 bends back winding about the head and connecting to discharge nozzle 14 that is inclined approximately 25 degrees to the inside face of disc 15. The compressed air passage terminates in a collector ring 80 to which is connected a tube 81 having on the end thereof a nozzle 22. A vacuum inlet 82 is located behind the knife 20 and connects through duct 78 to a peripheral recess 83 which in turn connects into vacuum segment 74. Seals 84, 85, 86 and 87 prevent leakage between the concentric tubular segments at their point of connection to their respective ports.

Figure 8:
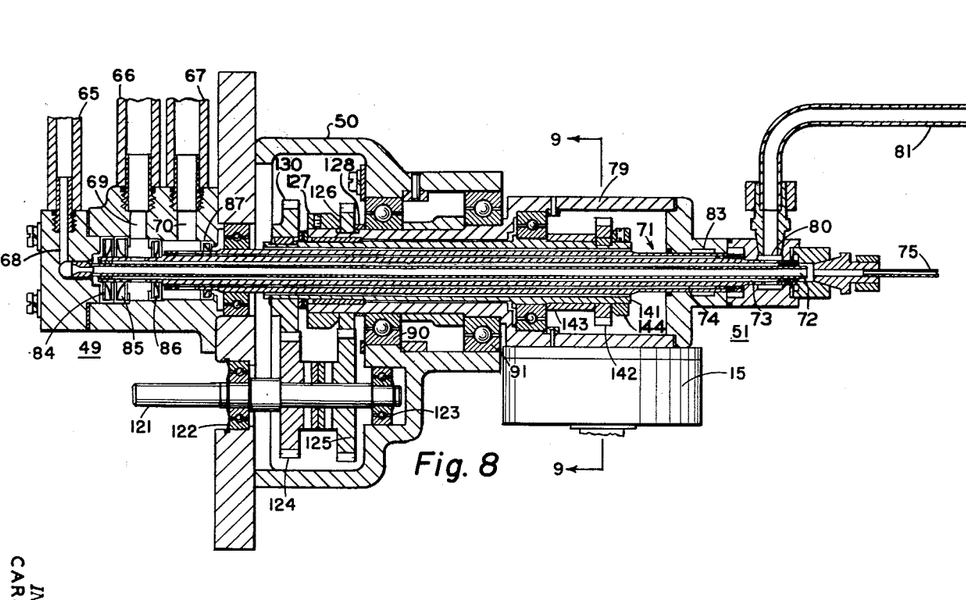
FIG. 8 is a sectional view taken substantially along lines 8—8 of FIG. 7.
Figure 9:
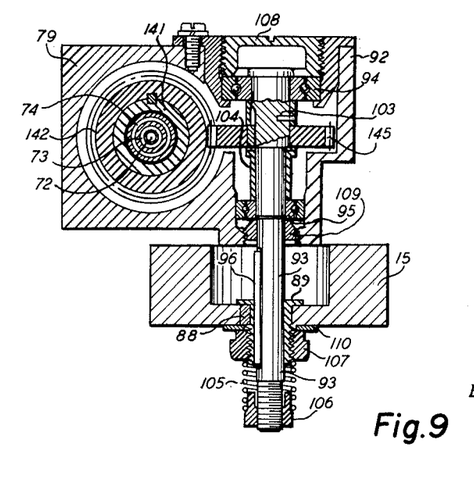
FIG. 9 is a sectional view taken substantially along lines 9—9 of FIG. 8.

Head 51 includes a housing 79 that extends inwardly of gear housing 50 being supported for rotation in bearings 90 and 91, and is rotatable as described below. A support bracket 92 is mounted on housing 79 and supports knife 20 which has a hard cutting edge 97 of tungsten-carbide squared against the inner face of disc 15.

Disc 15 is supported via a key 88, bushing 89 and key 96 to arbor 93 in turn connected via dowel 103 to spacer 104. The arbor is supported for independent rotation in bearings 94 and 95. A spring 105 is compressed between retainer nut 106 and lock nut 107 which bears against flat washer 110 to urge the inner face of the disc continuously against the cutting edge of the knife. A screw cap 108 has an annular flange to maintain bearing 94 in place while lock nut 109 maintains bearing 95 in place.

Rotation of head 51 is achieved by operation of motor M-1 which through gear reducer 120 rotates input shaft 121 supported in bearings 122 and 123 and driving spur gears 124 and 125 rotatably mounted between the bearings. Gear 125 meshes with gear 126 secured between a lock nut 127 and a retainer ring 128 and is connected by keying to the exterior of housing 79.

Tube 71 is rotated in conjunction with rotation of the head by means of spur gear 130 meshing with gear 124. Gear 130 is connected by keying to sleeve 141 coaxially mounted about tube 71. Keyed to the sleeve at the opposite end is a helical gear 142 urged against a spacer bushing 143 by a lock nut 144 and meshing with a helical gear 145 at right angles thereto and keyed to arbor 93. With the disc being secured to the arbor, the entire head is rotated about the axis of tube 71, while disc 15 revolves therewith and also rotates independently about the axis of arbor 93.

In operation a donor sheet, plate or the like, 16, is positioned at aperture 12 and yoke 45 is pivoted to mask the frame gasket 59 thereagainst. Solenoid SOL-1 and and SOL-3, aerosol generator 1 and motor M-1 are simultaneously energized to provide services to the toner head and to effect its rotation respectively. As the head rotates, the impact of the aerosol impinging off the face of disk 15 causes the powder toner particles to become electrostatically charged to the desired polarity. The particles are ricocheted off the disc from a position offset to the main axis of rotation such that the charged powder particles travel in a spray pattern until striking a donor plate electrically maintained and to which the particles adhere. By spraying from a position offset from the main axis while rotating the head, the spray originates from continuously varying points in a circle circumscribed about the axis of rotation approaching the donor surface inclined from the normal. Disc 15 is also rotated at a slower rate during which knife 20 scrapes the inner surface to provide a previously unimpinged or renewed surface on which the aerosol can impinge. By this means, consistency of powder charging is maintained. Operation is continued for a time period predetermined to insure uniformity of toner application on the donor. On completion of the toner application, the services and rotation are discontinued. The yoke is again pivoted to permit the toned donor plate to be removed. With a new donor plate in position, solenoid SOL-2 is energized to exhaust stray powder from the housing caused by the previous operation.

Whereas the specification thus far has been primarily directed toward the preparation of donor sheets, it is not intended to be so limited. Rather the apparatus of the invention has been found to have utility not only to applying toner uniformly onto a recipient surface but also to applying the toner for image development where the recipient surface contains an electrostatic image thereon. Thus the recipient surface may, for example, be a xerographic plate on which an electrostatic latent image has been formed as described in the above-cited Carlson patent.

For this application, the apparatus of the invention has been useful in developing reversed or negative images of high fidelity on which oppositely charged toner deposits in the background or non-image areas. Thus with the apparatus of the invention, the aerosol is caused to move toward the electrostatic-image-bearing photoconductor with a component of velocity normal to the surface of the photoconductor and is actively assisted in depositing in background areas by electrostatic fields while simultaneously deposition in character areas is prevented by the electrostatic fields from the electrostatic image. It is believed that the aerosol velocity and space charge fields drive the toner toward the photoconductor while the electrostatic image field repels toner away from the image areas.

There must, of course, be a balance between the momentum of the toner particle and the force exerted on the particle by the image field. Consider a toner particle, positively charged, approaching a character area of positive charge with no charges remaining on the photoconductor in the background area. If the momentum of the particle is low, it will be deflected away from the background area immediately adjacent to the character. This will result in a low development rate adjacent to the character and consequent line broadening even though the fields adjacent to the character are in a direction to potentiate deposition. This low concentration of aerosol in areas adjacent to the character has been found to be overcome by increasing the aerosol velocity in a direction normal to the plate so that the toner particles penetrate through the fields that tend to drive the particle past the character edge. When the approach momentum is too high, the character fields may not be strong enough to prevent deposition in the character area. Alternatively instead of utilizing controlled particle momentum, line broadening is prevented by oscillating the photoconductor in the plane of its surface or by introducing the aerosol at an appropriate angle to the photoconductor surface.

Since many changes could be made in the above construction and many apparently widely different embodiments of this invention could be made without departing from the scope thereof, it is intended that all matter contained in the drawings shall be interpreted as illustrative and not in a limiting sense.

What is claimed is:

1. Apparatus for charging electroscopic powder particles, said apparatus comprising in combination:
   (a) inlet means to receive a pressurized aerosol of powder particles;
   (b) outlet means connected to said inlet means and adapted to directionally discharge the aerosol;
   (c) a substantially planar surfaced charging member having a portion of its surface supported in the path of aerosol discharge angularly to the discharge direction for effecting a predetermined angular deflection thereof, said charging member being characterized by triboelectrically charging electroscopic powder particles impinging against its surface; and
   (d) means for effecting relative movement between the discharge direction of said aerosol and said charging member whereby to continuously change the surface area on which said particles impinge against said charging member.

2. Apparatus for charging electroscopic powder particles, said apparatus comprising in combination:
   (a) inlet means to receive a pressurized aerosol of powder particles;
   (b) outlet means connected to said inlet means and adapted to directionally discharge the aerosol;
   (c) a substantially planar surfaced charging member having a portion of its surface supported in the path of aerosol discharge angularly to the discharge direction for effecting a predetermined angular deflection thereof, said charging member being characterized by triboelectrically charging electroscopic powder particles impinging against its surface;
   (d) scraping means operable against the surface of said member to effectively clean the surface portion impinged against by said particles; and,
   (e) means for effecting relative movement between the discharge direction of said areosol and said charging member whereby to continuously change the surface area of impingement to a surface portion cleaned by said scraping means.

3. Apparatus for charging electroscopic powder particles, said apparatus comprising in combination:
   (a) inlet means to receive a pressurized aerosol of powder particles and to directionally discharge the aerosol;
   (b) a substantially planar surfaced charging member having a surface portion supported in the path of aerosol discharge angularly to the discharge direction to deflect the aerosol in a predetermined direction relative to said surface, said charging member being characterized by triboelectrically charging electroscopic powder particles impinging against its surface;
   (c) means to continuously advance said charging member in a recycling path about said discharge to place a changing portion of surface in said path of discharge; and,
   (d) surface removal means operating against the impinging surface of said advancing charging member to remove a surface portion of said charging member prior to the area thereof being advanced into said path of discharge whereby consistency of charging effect is affected by a continuous aerosol discharge impinging against the surface area from which the surface portion was removed by said surface removal means.

4. The apparatus of claim 3 in which said surface removal means includes a scraping edge in contact with the surface of said member.

5. Apparatus for charging electroscopic powder particles, said apparatus comprising in combination:
   (a) inlet means to receive a pressurized aerosol of powder particles and to directionally discharge the aerosol;
   (b) a substantially planar surfaced charging member having a surface portion positioned in the path of aerosol discharge angularly to the discharge direction to deflect the aerosol, said charging member being characterized by triboelectrically charging electroscopic powder particles impinging against its surface;

(c) surface removal means positioned against the surface of said charging member to remove surface portions of said member moving relatively therepast;

(d) means to obtain relative movement between said charging member and said surface removal means to effect an advancing surface removal of said member; and, (e) means operative relative to the directional discharge of said aerosol and the surface of said charging member to continuously impinge said discharge onto an area from which a portion of surface has been removed by said surface removal means.

6. Apparatus for applying charged electroscopic powder particles onto a receiving member, said apparatus comprising in combination:
   (a) a housing;
   (b) powder charging means in said housing, said charging means including;
       (1) inlet means extending out of said housing to receive a pressurized aerosol of powder particles;
       (2) outlet means connected to said inlet means and adapted to directionally discharge the aerosol;
       (3) a substantially planar surfaced charging member having a portion of surface supported in the path of aerosol discharge in aerosol deflecting relation thereto, said charging member being characterized by triboelectrically charging electroscopic powder particles impinging against its surface; and,
       (4) means for effecting relative movement between the discharge direction of said aerosol and said charging member whereby to continuously change the surface area on which said particles impinge against said charging member; and,
   (c) means to support a receiving member in a predetermined spaced orientation to said charging member in the path of aerosol deflection from said charging member.

7. Apparatus for applying electroscopic powder particles onto the surface of a receiving member, said apparatus comprising in combination:
   (a) a housing;
   (b) powder charging means in said housing, said charging means including;
       (1) inlet means extending out of said housing to receive a pressurized aerosol of powder particles, and to directionally discharge the aerosol within said housing;
       (2) a substantially planar surfaced charging member having a portion of surface supported in the path of aerosol discharge arranged to deflect the aerosol from said surface portion in a controlled deflection path, said charging member being characterized by triboelectrically charging electroscopic powder particles impinging against its surface; and,
       (3) means for effecting relative movement between the discharge direction of said aerosol and said charging member whereby to continuously change the surface area on which said particles impinge against said charging member;
   (c) an aperture in said housing at which to support a receiving member positioned in the deflection path of said aerosol whereby powder particles in the aerosol deposit against the surface of the receiving member; and,
   (d) means to vary the deflection path of said aerosol relative to said aperture to control the distribution of particles depositing against the receiving member.

8. Apparatus for applying electroscopic powder particles onto the surface of a receiving member, said apparatus comprising in combination:
   (a) a housing;
   (b) powder charging means in said housing, said charging means including:
       (1) inlet means extending out of said housing to receive a pressurized aerosol of powder particles, and to directionally discharge the aerosol within said housing;
       (2) a substantially planar surfaced charging member having a surface portion supported in the path of aerosol discharge arranged to deflect the aerosol from said surface portion in a controlled deflection path, said charging member being characterized by triboelectrically charging electroscopic powder particles impinging against its surface;
       (3) scraping means operable to effectively clean the surface of said member impinged against by said particles; and
       (4) means for effecting relative movement between the discharge direction of said aerosol and said charging member whereby to continuously change the surface area of impingement to a surface portion cleaned by said scraping means;
   (c) an aperture in said housing at which to support a receiving member positioned in the deflection path of said aerosol whereby powder particles in the aerosol deposit against the surface of the receiving member; and,
   (d) means to effect substantially uniform deposit of the powder particles on the surface of the receiving member defined by said aperture.

9. Apparatus for the application of electroscopic powder particles onto the surface of a receiving member comprising in combination:
   (a) aerosol generating means to generate a flow of a pressurized aerosol of powder particles;
   (b) support means to support a receiving member with its surface disposed in the flow path of the aerosol to receive an application of charged powder; and
   (c) a charging unit supported intermediate said generating means and said support means and including:
       (1) a housing;
       (2) an aperture in said housing disposed to be adjacent a receiving member supported in said support means;
       (3) inlet means extending into said housing to receive areosol from said generator and to discharge the aerosol within said housing;
       (4) a substantially planar surfaced charging member within said housing which imparts a triboelectric charge to powder particles impinging against its surface, said charging member being positioned and disposed with a portion of its surface in the discharge path of said inlet means for aerosol particles to impinge thereagainst, the plane of said surface portion being arranged to deflect the particles impinging against its surface into a deflection path extending through said aperture whereby the powder particles adhere to the surface of a member supported thereat; and,
       (5) means for effecting relative movement between the discharge direction of said aerosol and said charging member whereby to continuously change the surface area on which said particles impinge against said charging member.

10. Apparatus according to claim 9 including means to maintain the surface of the receiving member at a controlled polarity relative to the polarity to which the powder particles are charged.

11. Apparatus according to claim 9 including means operable to alter said aerosol deflection path relative to said aperture to achieve uniform distribution of particles to be deposited on the surface of a member on its support means.

12. The apparatus according to claim 11 wherein the receiving member is a xerographic plate containing a pattern of electrostatic charges on its surface.

13. Apparatus according to claim 9 in which said relative movement between the discharging aerosol and the surface of said charging member is effected by drive means operatively connected to rotate said disc relative to the discharge path of said inlet means whereby the aerosol impinges against advancing side surface portions of said disc.

14. Apparatus according to claim 13 including scraping means positioned against the side surface of said disc to continuously renew the surface portions prior to being impinged against by the aerosol.

15. Apparatus according to claim 14 wherein said scraping means at least partially employs a cutting action to cut away surface portions against which aerosol has previously impinged against.

References Cited in the file of this patent

UNITED STATES PATENTS

| | | |
|---|---|---|
| 945,917 | Cottrell | Jan. 11, 1910 |
| 2,245,301 | Schacht | June 10, 1941 |
| 2,396,533 | Root | Mar. 12, 1946 |
| 2,574,284 | Prochazka | Nov. 6, 1951 |
| 2,590,534 | Hampe | Mar. 25, 1952 |
| 2,657,339 | Hampe | Oct. 27, 1953 |
| 2,711,481 | Phillips | June 21, 1955 |
| 2,859,129 | Hayford | Nov. 4, 1958 |
| 2,861,543 | Crumrine et al. | Nov. 25, 1958 |
| 2,914,221 | Rosenthal | Nov. 24, 1959 |
| 2,943,950 | Ricker | July 5, 1960 |
| 2,944,029 | Jones et al. | July 5, 1960 |
| 3,009,826 | Straughn et al. | Nov. 21, 1961 |